United States Patent [19]
Andrews

[11] Patent Number: 5,852,354
[45] Date of Patent: Dec. 22, 1998

[54] MULTIPLEXING RATE GENERATOR/ COUNTER CIRCUIT FOR CONTROLLING STEPPER MOTORS

[75] Inventor: J. Randolph Andrews, Campbell, Calif.

[73] Assignee: Douloi Automation, Inc., Campbell, Calif.

[21] Appl. No.: 935,324

[22] Filed: Sep. 22, 1997

[51] Int. Cl.$^6$ ................................................. G05B 13/32
[52] U.S. Cl. .......................................... 318/562; 318/685
[58] Field of Search ................................... 318/696, 685, 318/562, 41; 364/174, 400

[56] References Cited

U.S. PATENT DOCUMENTS

| | | | |
|---|---|---|---|
| 4,055,786 | 10/1977 | DiMazio | 318/562 |
| 4,734,847 | 3/1988 | Hunter | 364/174 |
| 5,237,250 | 8/1993 | Zeile et al. | 318/562 |

*Primary Examiner*—William M. Shoop, Jr.
*Assistant Examiner*—Rita Leykin
*Attorney, Agent, or Firm*—The Kline Law Firm

[57] ABSTRACT

A multiplexing circuit which rapidly shares a single rate generator among up to 16 different motors. The circuit utilizes an addend memory block with n-bit by m-deep memory structures. Each memory address represents a particular stepper motor in the system. An axis scanning state machine 9 drives the memory structure address lines in a circuitous manner. At each memory address visit, the state of the circuit is re-established based on information stored from the last visit. The addition operation is performed to change the accumulator value in memory block 102. Any possible edge event is noted by edge detector 11. An edge produces a step and position monitor count. The axis-scanning state machine then moves on to the next address representing the next motor. The axis-scanning memory address influences memory structures throughout the device including accumulator value in memory block 102, addend memory values 12, device configuration 13, and step monitor counter 14. The complete axis-scanning cycle frequency of N Hz supports step rates of N Hz.

3 Claims, 15 Drawing Sheets

MULTIPLEXING RATE GENERATOR/ COUNTER CIRCUIT FOR CONTROLLING STEPPER MOTORS

FIELD OF THE INVENTION

The present invention relates generally to stepper motor control systems, and more particularly is a multiplexing electrical hardware design. The design creates a programmable step rate for a group of stepper motors through an addition technique based on information written from a controlling processor. Total steps produced are counted to monitor motor position.

BACKGROUND OF THE INVENTION

One common method of controlling a stepper motor is for a microprocessor to calculate at a fixed period (for example 1000 Hz) the necessary motor speed and direction to fulfill a motion profile. The motor speed is mapped into data values that are placed in rate-generating electronics which produces step pulses corresponding to the desired motor speed. The rate is continuously adjusted to realize the desired motion profile.

FIG. 1 illustrates one method of producing a programmable rate and monitoring the total number of steps produced. A numeric value proportional to rate is loaded into adder latch 1 by a microprocessor. A fixed frequency clock causes the accumulator 2 to add to its stored value the value of the adder latch 1. The most significant bit (MSB) 3 of the accumulator drives an edge detector 4 which detects when the MSB 3 overflows and changes. The edge detector produces a step pulse 5. Placing smaller values in adder latch 1 requires many cycles to overflow accumulator 2. Large adder values overflow the accumulator sooner creating higher step rates. Adder values of 0 cause no accumulator change and represent 0 rate. By detecting both rising and falling edges of the accumulator MSB 3, the edge detector 4 generates two steps for every complete numeric cycle of accumulator 2. A step rate of N Hz can be produced by an accumulator clock rate of the same N Hz frequency. A Motion Enable signal 6 can be unasserted to clear the adder, thus preventing any further steps from being produced. Direction latch 7 is used to establish direction signal 8 for indicating positive or negative stepper motor motion.

An alternative common method of generating a programmable rate or frequency is to use a "divide-by-n counter". One implementation of this method is to drive a loadable down-counter with a fixed frequency. The counter is loaded with a data value representing the desired rate period, the inverse of the frequency. When the counter decrements to 0, the programmed value is reloaded and the down-counter decrements again. By placing small values in the load register, high rates are produced. By placing large values in the load register, lower rates are produced. The controlling microprocessor performs the necessary calculations to discover what the required period is to accomplish a needed rate and submits that value as the period.

One problem with this approach is the mathematical character of dividing by a digital number as the number gets small and represents a high frequency. As the period number drops below values near 20, the change in frequency for a single increment or decrement of the divider value is significant and sudden. The stepper motors being driven by this signal cannot tolerate a sudden change in frequency and may "lose sync" and not retain their intended positions. This effect places a limit on how small the divisor can be. An additional consequence of this effect is that it is difficult to realize a frequency which is not a clean factor with the divisor. Values in between discrete period values cause the microprocessor to "dither" frequencies in an attempt to realize the intended midpoint frequency through averaging. This also creates velocity disturbance and is therefore undesirable. Divide-by-n devices suffer from divisor quantization because they require n to be an integer although a fractional value may be desired.

The "adder" method of rate generation has a number of benefits. One benefit is that a rate of 0 Hz can be expressed. Divide-by-n cannot express a 0 rate because the period parameter would need to be infinity. Additionally, there is no degradation of frequency resolution with increasing frequency as there is with the divide-by-n approach. When the adder wraps the accumulator around, an implicit and beneficial hardware dithering effect occurs. The remainder of the overflow is kept in the accumulator allowing one step which was late due to discreetness to be followed by another step which is slightly early to compensate. Step events, compelled to land on clock edges, land as close as possible to the ideal edge locations and are adjusted on a pulse-by-pulse basis, not at the controller sample rate, which can be as much as 1000 times lower.

Another benefit of the adder method is that the clock frequency required to sustain an N Hz step rate can be as low as N Hz, the same frequency. In an embodiment of this type, the edge of the most significant bit in the accumulator is monitored for both rising and falling transitions. This produces two steps for each total accumulator cycle permitting this low addition clock rate. The minimum clock frequency to sustain an N Hz step rate with a divide-by-n counter is approximately 20N due to quantization degradation.

With both of the above described rate generation approaches, an increasing amount of physical hardware is required as the number of controlled stepper motors increases. Although functionally preferable, the "adder" approach requires more circuitry than the divide-by-n approach.

An additional function required of the electronics is counting the number of step pulses that are actually generated by the controller. The step count is influenced by the rate of steps being generated and the direction signal 8, used to tell the motor to move in the plus or minus directions. Plus movement increments steps, minus movement decrements steps. The current step value must be available so as to adjust the rate and obtain desired positions. This need to accumulate positive or negative pulses is similar to the quadrature decoder problem encountered with servo motors. However it does not require filtering since the signals are generated locally on the same controller board. A step signal 5 and a direction signal 8 drive a counter 9 which monitors the total number of steps produced. Readback latch 10 allows the counter value to be stable prior to being read by the microprocessor.

There are many prior art devices directed to stepper motor controllers. An early patent, "Control System . . . " of Kreithen et al., U.S. Pat. No. 3,932,796, issued Jan. 13, 1976, discloses a method of analog motor control. Analog methods are not considered viable for today's controllers due to problems with linearity and dynamic range.

A reference that introduced the use of digital signals to control stepper motors is the "Microprocessor Controlled Micro-Stepping Chart Drive" of Daniel et al., U.S. Pat. No. 4,377,847, issued Mar. 22, 1983. Some analog signal control is still used.

A patent that specifically defines the divide-by-n method is the "Stepper Motor Rate Control" of Johnson, U.S. Pat.

No. 4,218,642, issued Aug. 19, 1980. Another patent that utilizes a "frequency dividing counter" is the Pulse Motor Control Apparatus" of Takeuchi, et al., U.S. Pat. No. 4,703,244, issued Oct. 27, 1987. The shortcomings inherent in the divide-by-n approach as described above are included in these devices.

The "Microstepping Motor Controller Circuit" of Hunter, U.S. Pat. No. 4,734,847, issued Mar. 29, 1988, discusses an "adder" rate generation method. The Hunter reference teaches that the adder method of rate generation is not economically feasible in a specific application as the peripheral circuitry required is too expensive.

Accordingly, it is an object of the present invention to provide a circuit that economically utilizes an adder rate generation method.

It is a further object of the present invention to provide a circuit that allows the adder to be rapidly shared by a group of motors.

It is a still further object of the present invention to provide a circuit that will enable the stepper motors to utilize the rate information without interfering with the cycle of the rate generation.

SUMMARY OF THE INVENTION

The present invention is a multiplexing circuit technique which rapidly shares a single prior art style solution among 16 different motors. Rather than replicate prior art solutions N times to control N motors, the multiplexing technique described provides a circuit which rapidly shares a single rate generator among up to 16 different motors that run concurrently and independently.

FIG. 2 shows an overview of the multiplexing circuit. The circuit utilizes an adder-generator circuit with n-bit by m-deep memory structures. Each memory address represents a particular stepper motor in the system. An axis scanning state machine 9 drives the memory structure address lines in a circuitous manner. At each memory address visit, the state of the circuit is re-established based on information stored from the last visit. The addition operation is performed to change the accumulator value in memory block 102. Any possible edge event is noted by edge detector 11. An edge produces a step and position monitor count. The axis-scanning state machine then moves on to the next address representing the next motor. The axis-scanning memory address influences memory structures throughout the device including accumulator value in memory block 102, adder values 12, device configuration 13, and step monitor counter 14. The complete axis-scanning cycle frequency of N Hz supports step rates of N Hz.

The multiplexing circuit of the present invention must interface to non-multiplexing surroundings. A method of writing rate and configuration information into the memory blocks without disturbing the ongoing activity of the axis-scanning state machine is accomplished with a synchronous writer 15. Information in the position counter is copied into readback shadow memory 16 and taken "off-line" by the microprocessor for inspection. "Snapshots" of step and direction signals are steered through switch 17 and latched in non-multiplexing latches 18 to preserve step and direction values between axis-scanning visits.

An advantage of the present invention is that it allows a single base circuit to be rapidly shared, thereby creating a solution which is more cost effective than gate arrays.

Another advantage of the present invention is that it is a completely digital solution.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
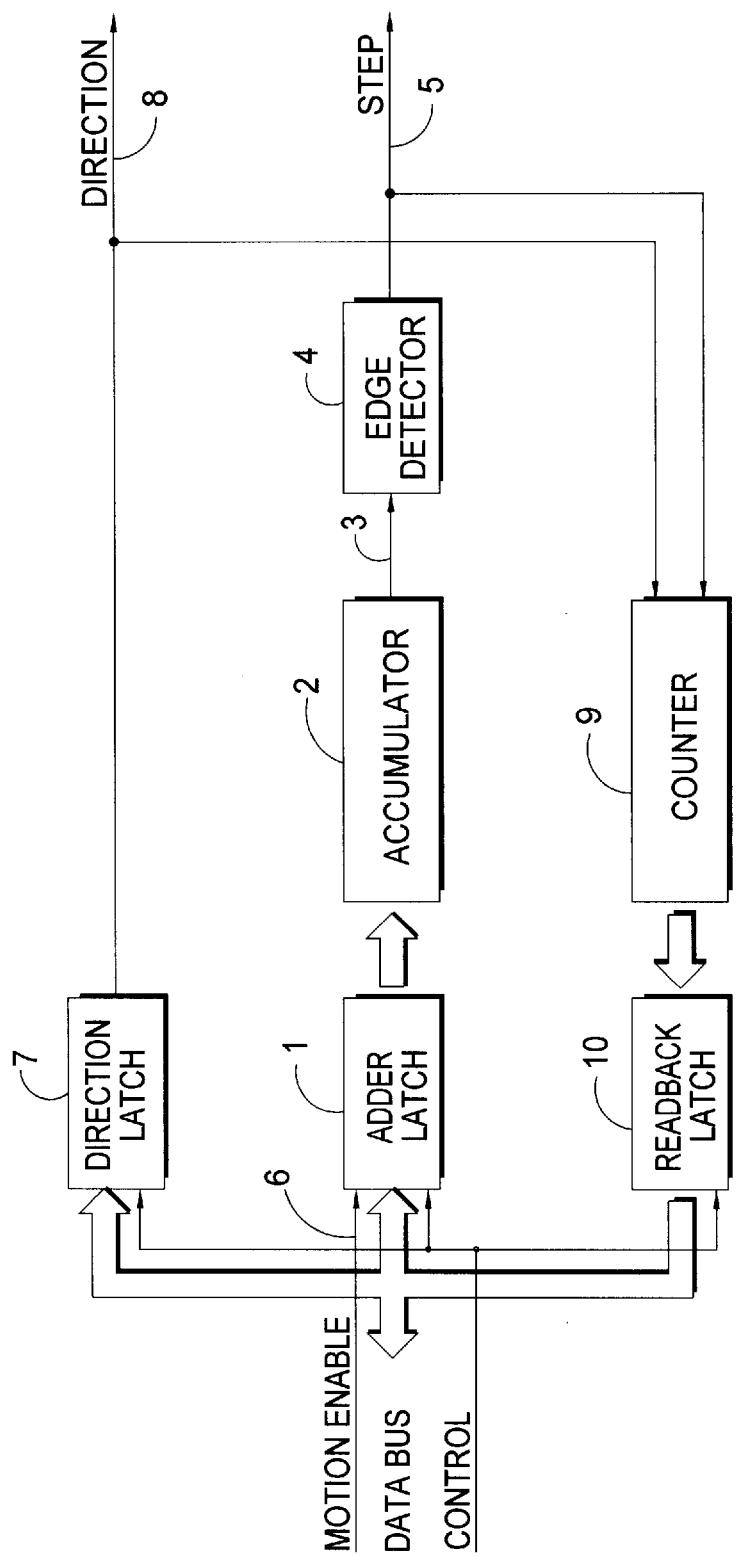
FIG. 1 illustrates a rate generator/counter of the prior art.
Figure 2:
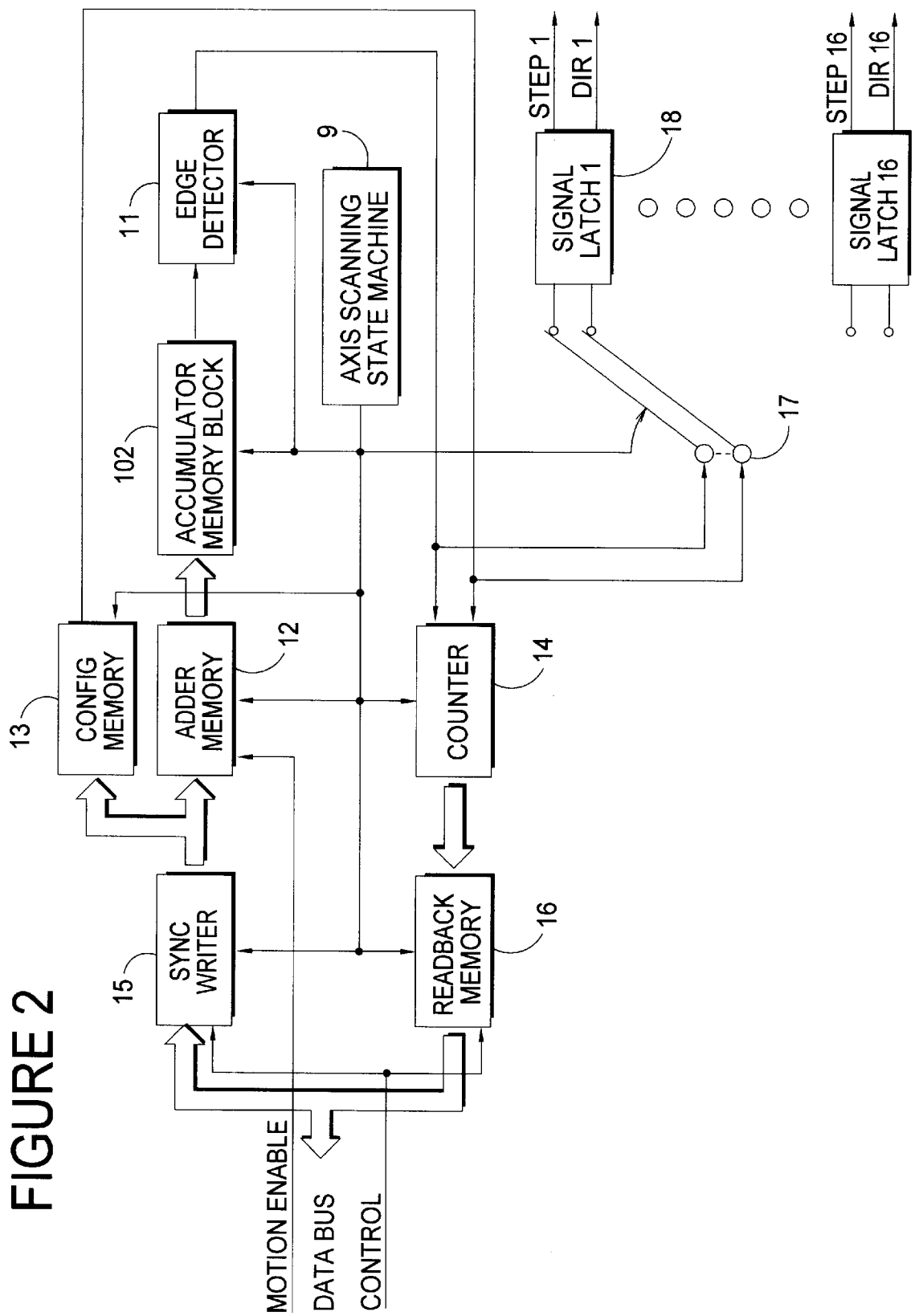
FIG. 2 is a block diagram of the rate generator/counter circuit of the present invention.
Figure 3:
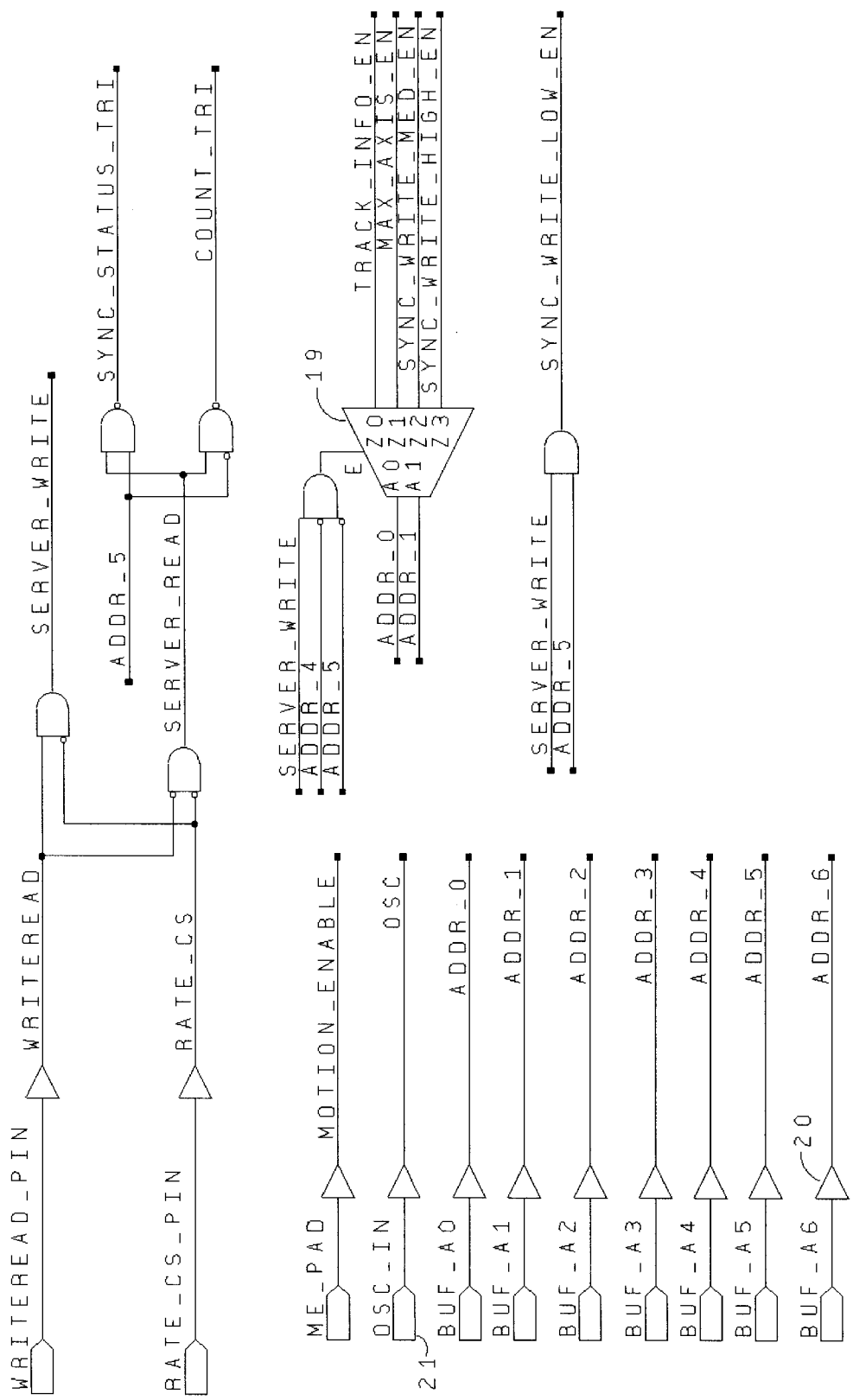
FIG. 3 shows the microprocessor interface.

The present invention is illustrated in FIGS. 3–15. FIG. 3 illustrates the Microprocessor Control Interface, which includes control signal decoding 19, buffers for address lines 20, and an "OSC" clock input 21 which operates in the preferred embodiment at 32 MHz.

Figure 4:
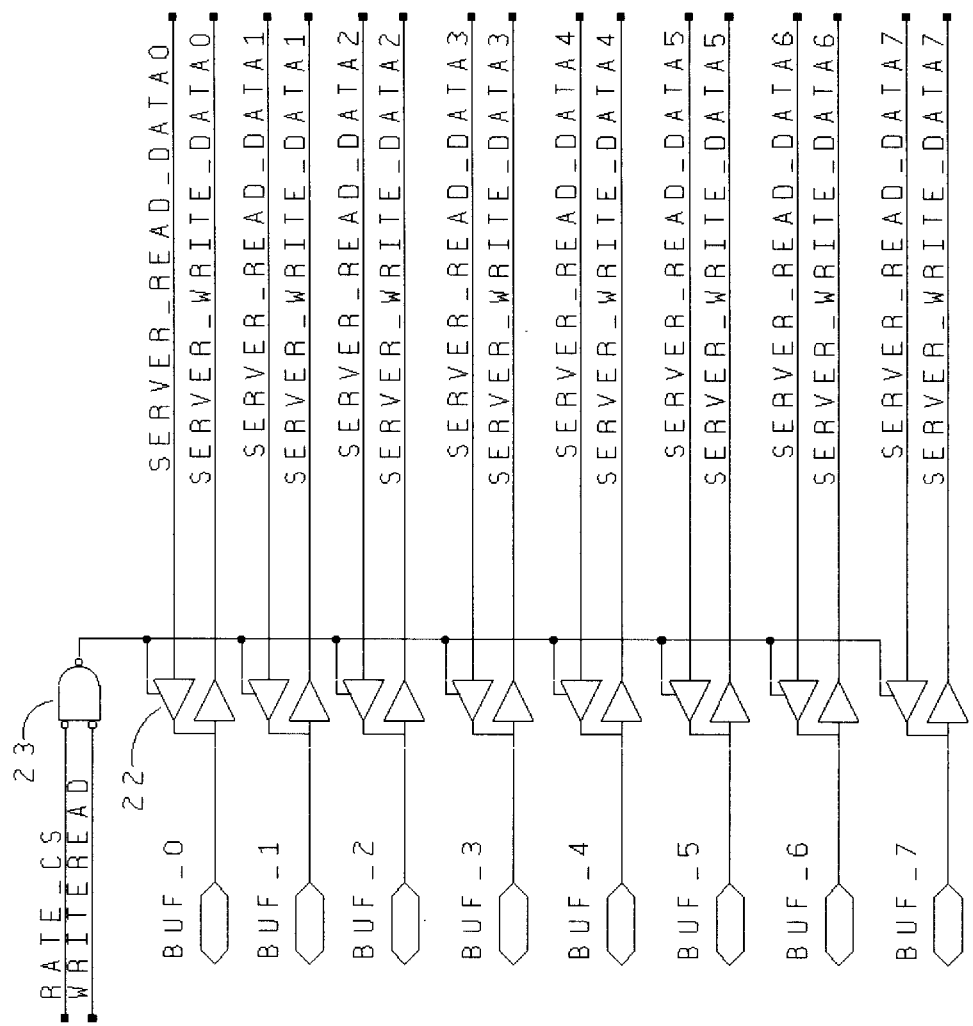
FIG. 4 illustrates the microprocessor bus interface.

FIG. 4 depicts the Microprocessor Bus Interface, which is composed of eight bidirectional buffers 22. Outgoing buffers are enabled by a chip select and read control signal through gate 23.

Figure 5:
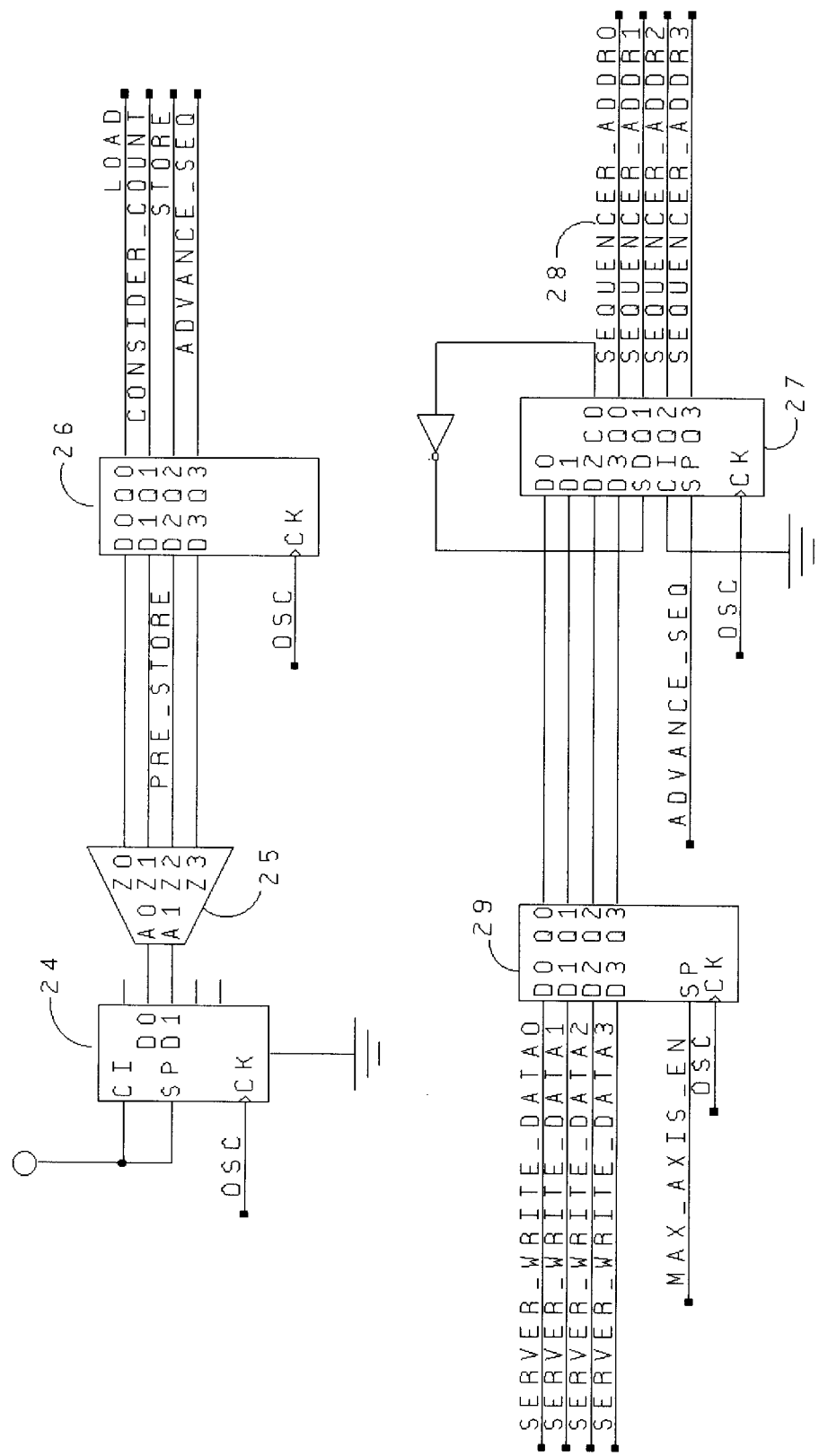
FIG. 5 shows the axis scanning state machine.

FIG. 5 shows the Axis Scanning State Machine, which includes a counter 24 that counts through four states. The state number is changed into a "one-hot" format by demultiplexer 25. State values are held stable in latch 26. The axis scanning state machine produces an ongoing cycle of the load-count-store-advance sequence.

When the advance_seq state is active, counter 27 decrements the sequencer address 28. After a sequencer address of zero, the counter reloads from latch 29 to circularly address all axes. The value stored in latch 29 represents the number of axes to be scanned. Scanning a smaller number of axes produces higher "visitation" frequencies for any particular axis and permits higher step rates.

Figure 6:
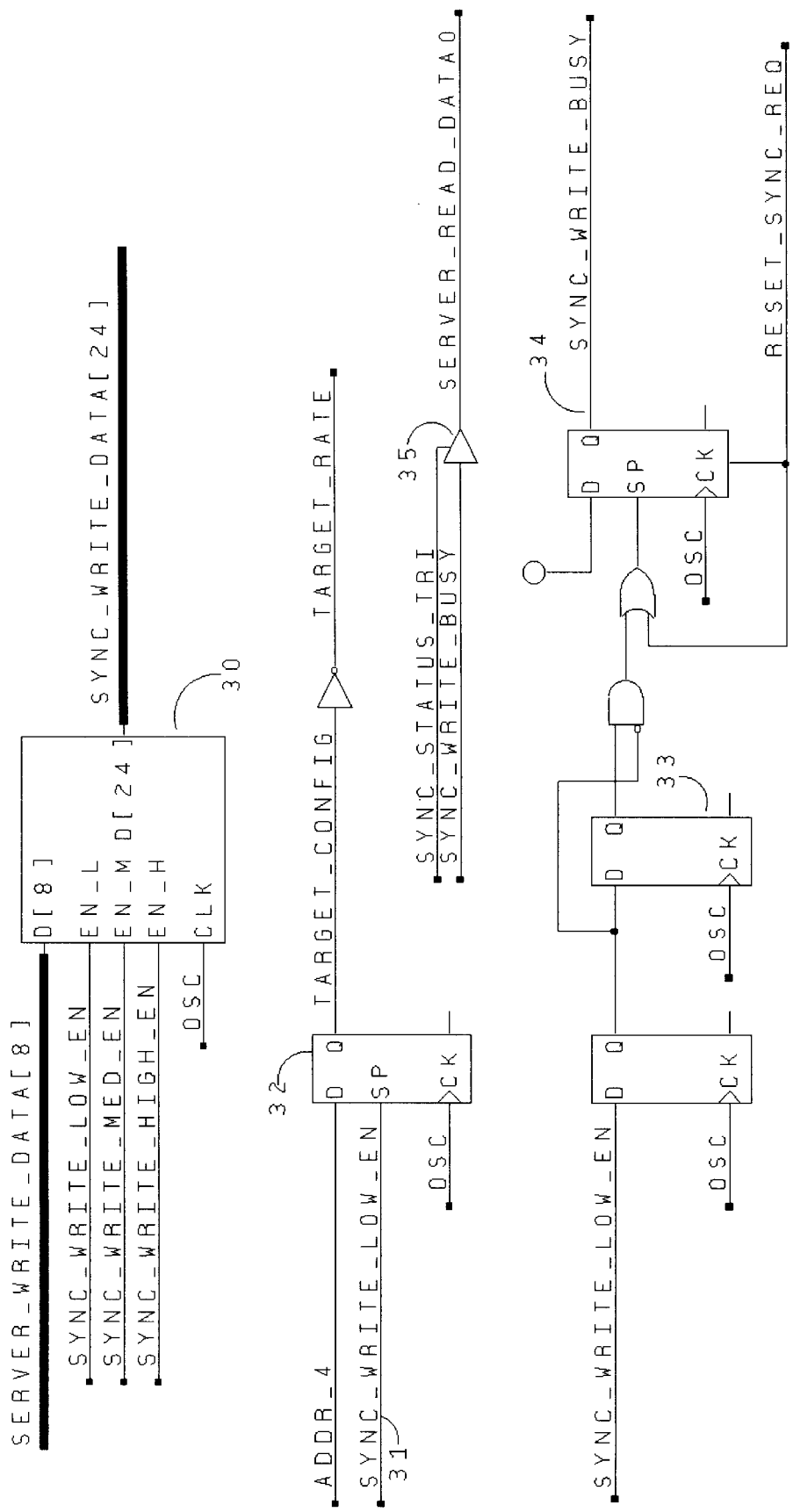
FIG. 6 shows the synchronous writer.

FIG. 6 illustrates the Synchronous Writer Stage, which is responsible for staging data provided by the microprocessor and writing it into the appropriate memory structure during a safe opportunity. There are two different destinations for data. One destination is a 24 bit rate "adder" value for a particular axis. The other destination is axis configuration including the "direction" signal. The microprocessor prepares a synchronous write by putting data into the staging latch 30. If the data size is more than 8 bits, multiple 8-bit writes are used to fill the latch. The last write occurs to the lowest byte through the signal SYNC_WRITE_LOW_EN 31 which arms the synchronous writer and performs a number of operations. SYNC_WRITE_LOW_EN records in latch 32 the target purpose for the information as either configuration of rate adder based on address line 4. SYNC_

WRITE_LOW_EN is latched in the latch series 33 to produce the signal SYNC_WRITE_BUSY after the trailing edge of SYNC_WRITE_LOW_EN has departed. SYNC_WRITE_BUSY is available to the microprocessor as status information through tristate buffer 35. The microprocessor must not disturb the synchronous writer until after the write operation has been completed and SYNC_WRITE_BUSY is no longer active.

Figure 7:
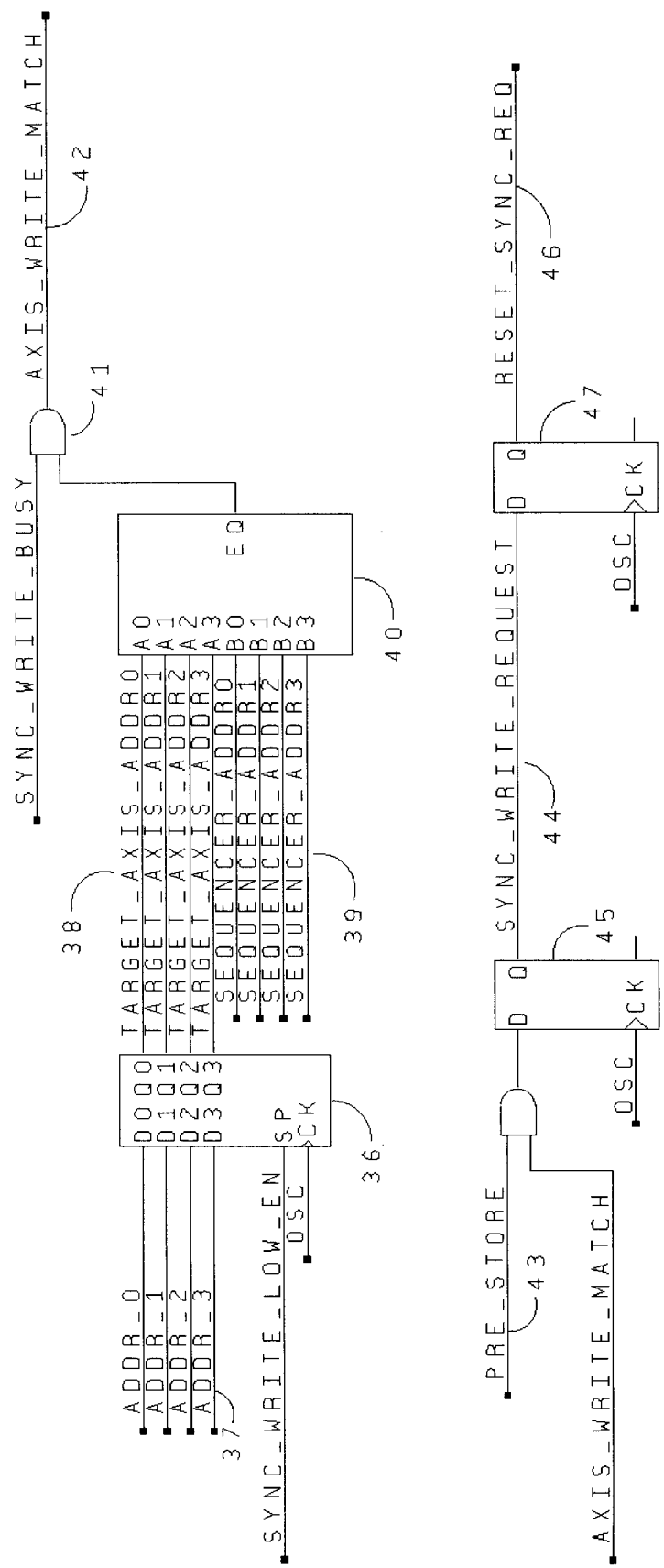
FIG. 7 illustrates the synchronous writer comparator.

FIG. 7 is the Synchronous Writer Comparator, which among other functions, uses the SYNC_WRITE_LOW_EN signal to record a target axis in latch 36 to receive the information. The axis is indicated by the address used for the write operation through address lines 37. The target axis address lines 38 and sequencer address lines 39 enter comparator 40 to determine when the axis scanning state machine is performing operations on the target axis that is to receive information. If this match occurs and there is a pending write operation as indicated by SYNC_WRITE_BUSY then gate 41 produces the signal AXIS_WRITE_MATCH 42. Now that the correct axis has been identified, the next step is to determine when in the load-count-store-advance cycle is the safe opportunity to perform the memory write. Signal AXIS_WRITE_MATCH 42 is "anded" with signal PRE_STORE to produce SYNC_WRITE_REQUEST 44 which is held stable in latch 45. SYNC_WRITE_REQUEST is the specific opportunity for safe transfer of information from the staging latch into scanning memory structures. The signal RESET_SYNC_REQ 46 becomes active one clock after SYN_WRITE_REQUEST through latch 47 to clear the SYNC_WRITE_BUSY signal. The synchronous writer is now available for another operation.

Figure 8:
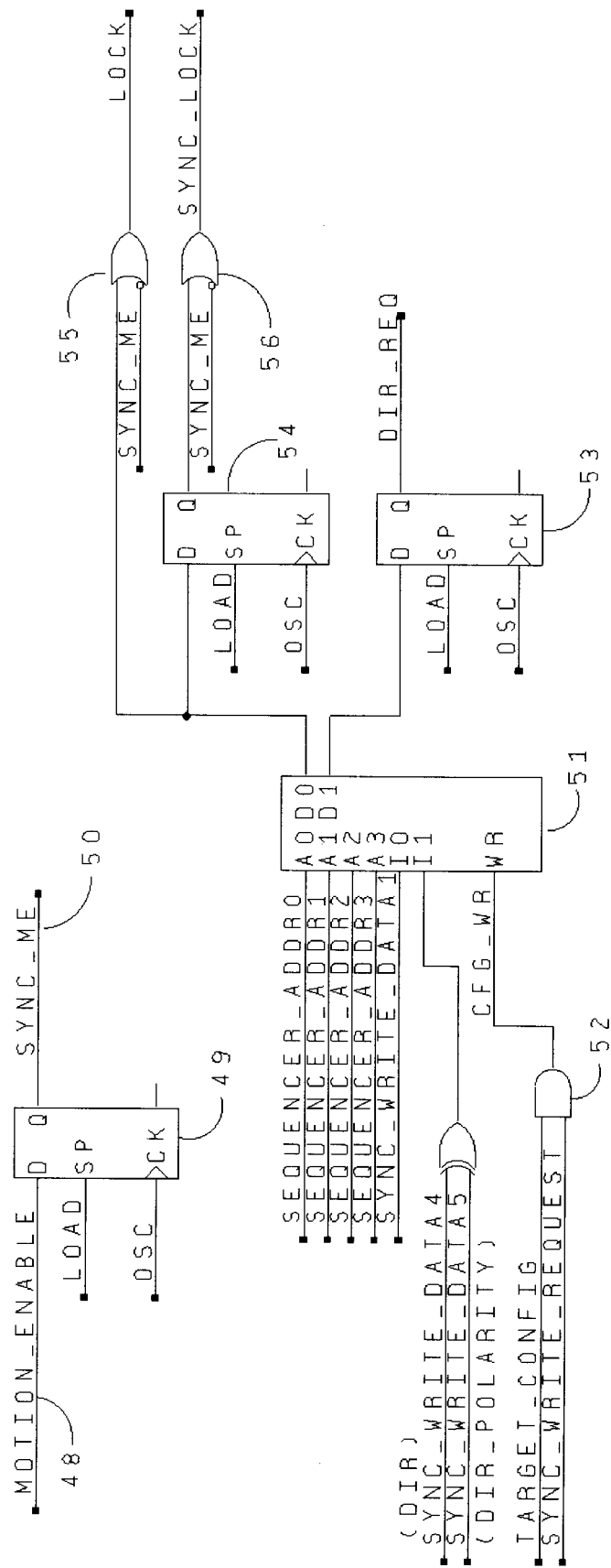
FIG. 8 illustrates the configuration memory.

FIG. 8 shows the operation of Configuration Memory Block 51. The Motion Enable signal 48 is used to enable and disable stepper pulses through a hardware input. Once stopped, the pulses will not begin again even if Motion Enable re-enables. Latch 49 generates the SYNC_ME signal 50 at the load point in the load-count-store-advance cycle.

A 2-bit wide, 16 deep configuration memory block 51 holds two pieces of information, the direction signal and a lock signal which prevents pulse generation for a particular axis regardless of the rate requested. Configuration memory block 51 is a synchronous writer target. Gate 52 determines that configuration memory is the destination for data, and pulses the write strobe on the memory block when SYNC_WRITE_REQUEST is active. Information is retrieved from the memory block 51 during the load point in the cycle. Latches 53 and 54 retain the data for the rest of the cycle. Gates 55 and 56 describe LOCK and SYNC_LOCK to be active if either a particular axis is locked by the microprocessor or the MOTION_ENABLE signal 48 is not asserted.

Figure 9:
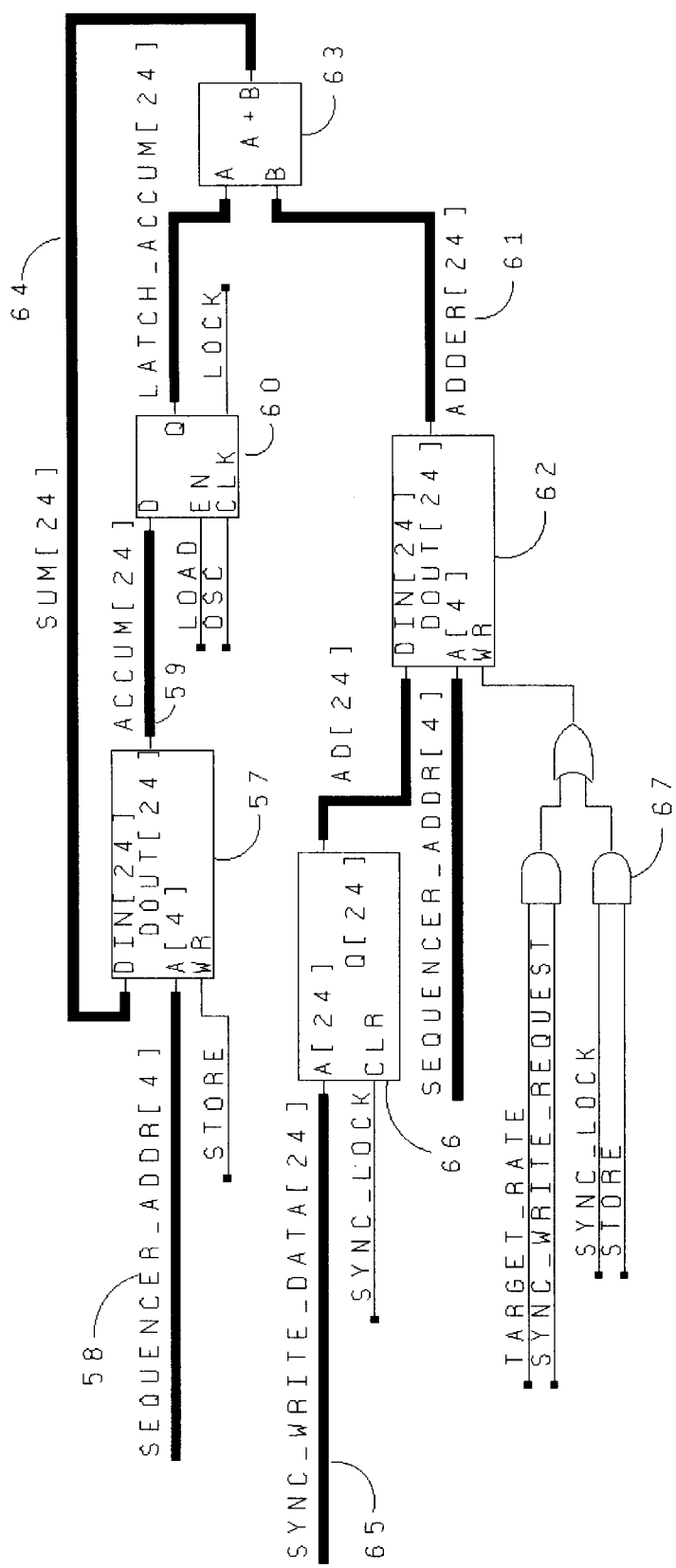
FIG. 9 is the circuit for the rate adder.

FIG. 9 shows the Rate Adder, a key element of the invention. The top of the figure is a loop representing a 24 bit data bus. The rate count accumulator 57 is a 24 bit by 16 deep memory block which contains the current accumulator value for all of the axes. For any particular axis, as selected by the SEQUENCER_ADDR address bus 58, the current accumulator value is presented on the ACCUM bus 59 which is retained in a 24 bit accumulator latch 60. This latching occurs at the "load" point in the cycle. The rate adder value for that particular axis is provided on the ADDER BUS 61 driven from the adder memory block 62, another 24 by 16 memory structure. The values on the two 24 bit busses are added together in the component summing element 63. The result, represented on bus SUM 64, goes back to the rate count accumulator 57 and is written during the STORE point in the cycle.

Adder memory 62 is a synchronous writer target. The microprocessor updates values in the adder memory 62 by performing synchronous write operations because controlling the memory address lines directly would disrupt operation of the load-count-store-advance cycle. SYNC_WRITE_DATA information destined for the adder memory 62 goes through a switch block 66 which is driven by SYNC_LOCK. This switch block is effectively a 24 pole, 2 throw switch which connects the adder memory data lines to either the SYNC_WRITE_DATA or ground. SYNC_LOCK is used to put a 0 value into ADDER_MEM to clear rate generation activity for a particular axis. Once the memory has been written to 0, the microprocessor must re-establish rate values even if SYNC_LOCK is unasserted, thereby producing a desirable "latching" effect for disabling step generation. Gates 67 produce a write to the adder memory 62 for writing data from the synchronous writer or for clearing rate information during a lock event.

Figure 10:
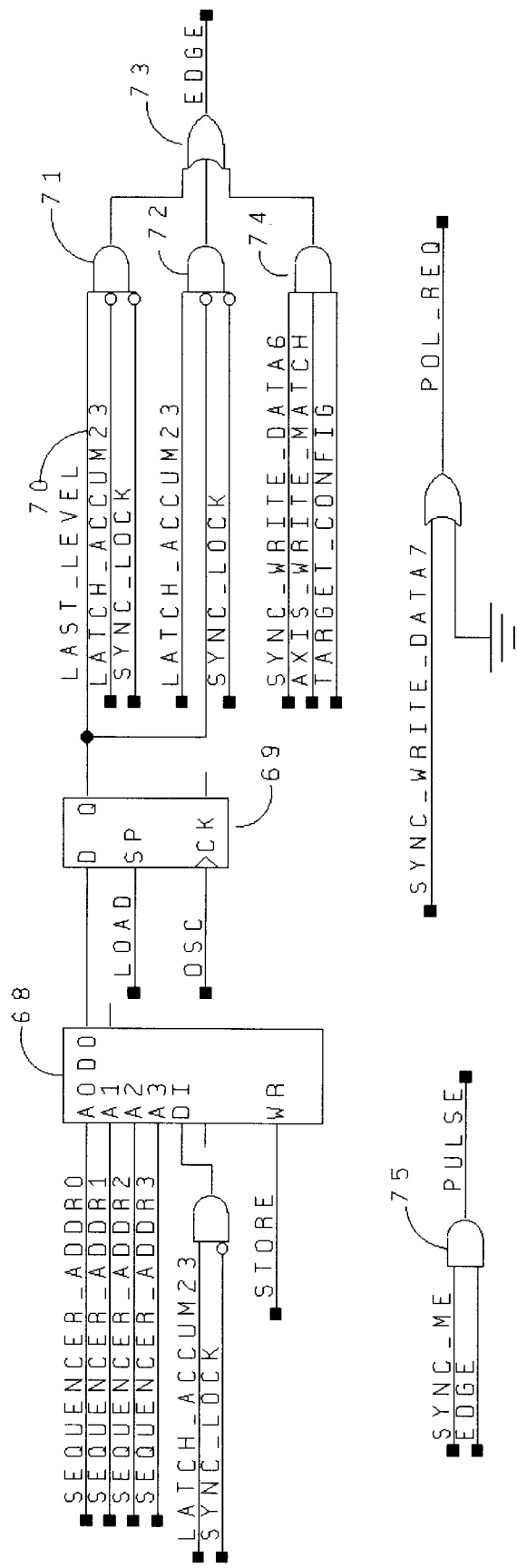
FIG. 10 describes the edge detector step pulse generation.

FIG. 10 illustrates the Edge Detector Step Pulse Generation in the circuit. The value of the most significant bit in the accumulator latch 60 is saved in memory block 68.

This bit is retrieved on the next cycle, retained in latch 69 and presented as signal LAST_LEVEL 70. Gate 71 detects a falling edge of the MSB and gate 72 detects a rising edge. Either edge generates a pulse through gate 73. In addition to pulses generated by the rate adder, the microprocessor can "inject" a pulse through software by writing a particular value to the configuration memory. This is detected by gate 74. Pulses are only permitted to continue through gate 75 if the SYNC_ME motion enable signal is asserted. The polarity of the step pulse comes from data bit 7 of the synchronous writer and is labeled POL_REQ 76 for use in managing the step pulse latches.

Figure 11:
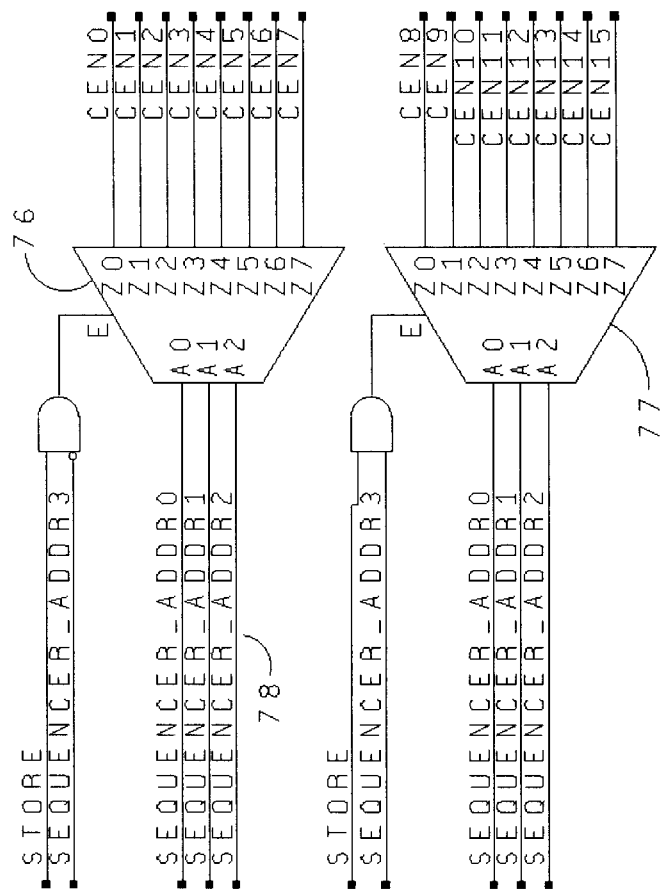
FIG. 11 shows the demultiplexer enables.

FIG. 11 shows the Demultiplexer Enables portion of the circuit. Transient step and direction information travelling inside the axis scanning state machine must be latched and held stable for use by the non-multiplexing outside world. Demultiplexers 76 and 77 take the binary number for the current axis, as indicated by the sequencer address bus 78, and produce an axis specific enable during the store portion of the load-count-store-advance cycle.

Figure 12:
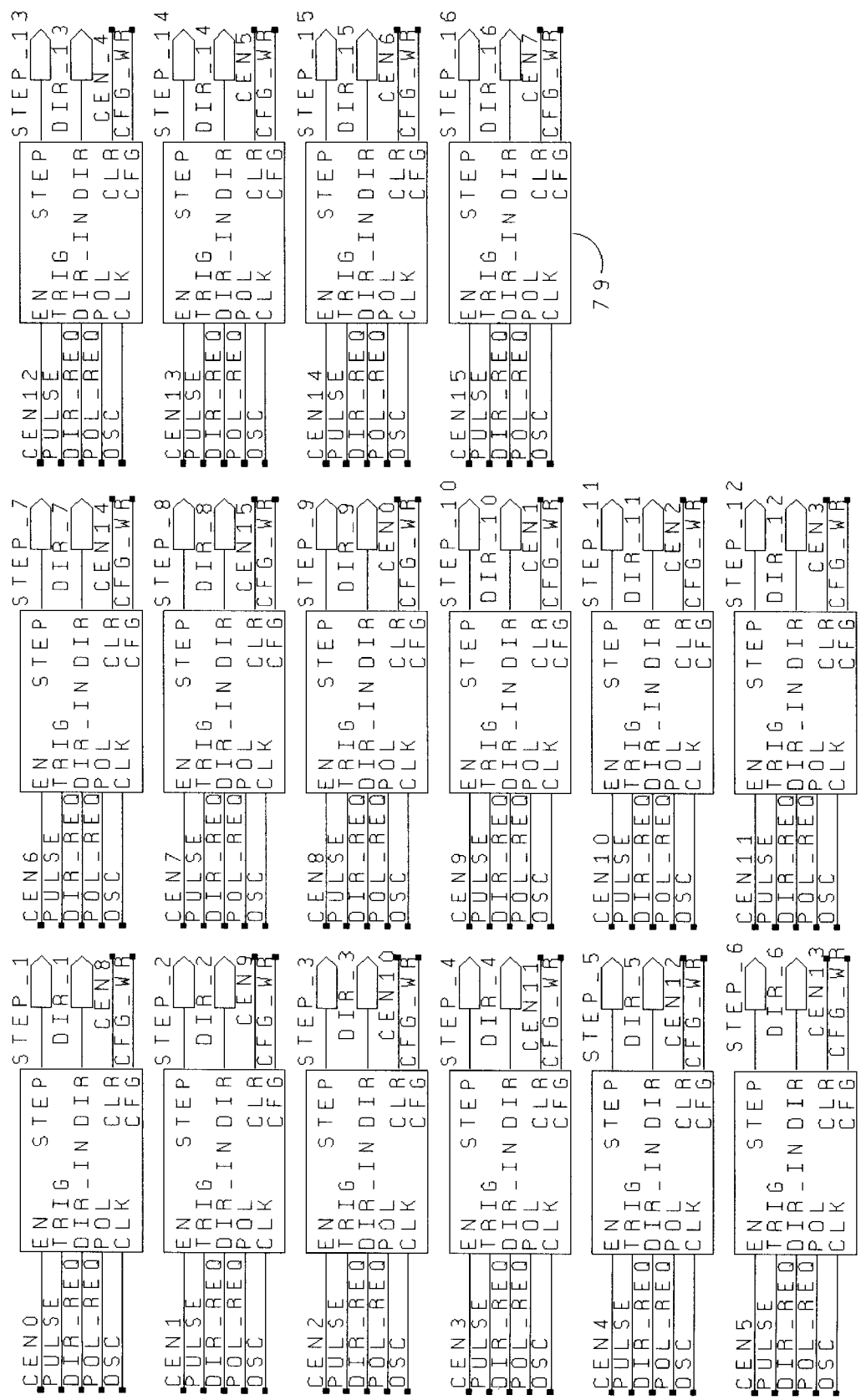
FIG. 12 shows the signal latching blocks.

FIG. 12 shows the Signal Latching Blocks. The signal latching blocks, of which 79 is an example, latch transient information inside the memory structures and present stable, persistent signals for each of the step and direction signal sets. Sixteen signal latching blocks are shown with the following signals:

CENX—block enable

PULSE_EN—indicates a pulse is being produced

DIR_REQ—the requested direction

POL_REQ—the polarity of the step pulse (active low or active high pulse)

OSC—the clock oscillator

CFG_WR—indicates the synchronous writer is writing configuration info

CENX+8—signal which is "opposite" CENX signal for resetting the pulse

Coming out of the blocks are two signals, STEP_X and DIR_X which are buffered signals ready to leave the FPGA chip. There are sixteen blocks receiving these signals. Only one block is selected at a time based on the CENX signal. When not selected, latches inside the block retain the values of step and direction.

Figure 13:
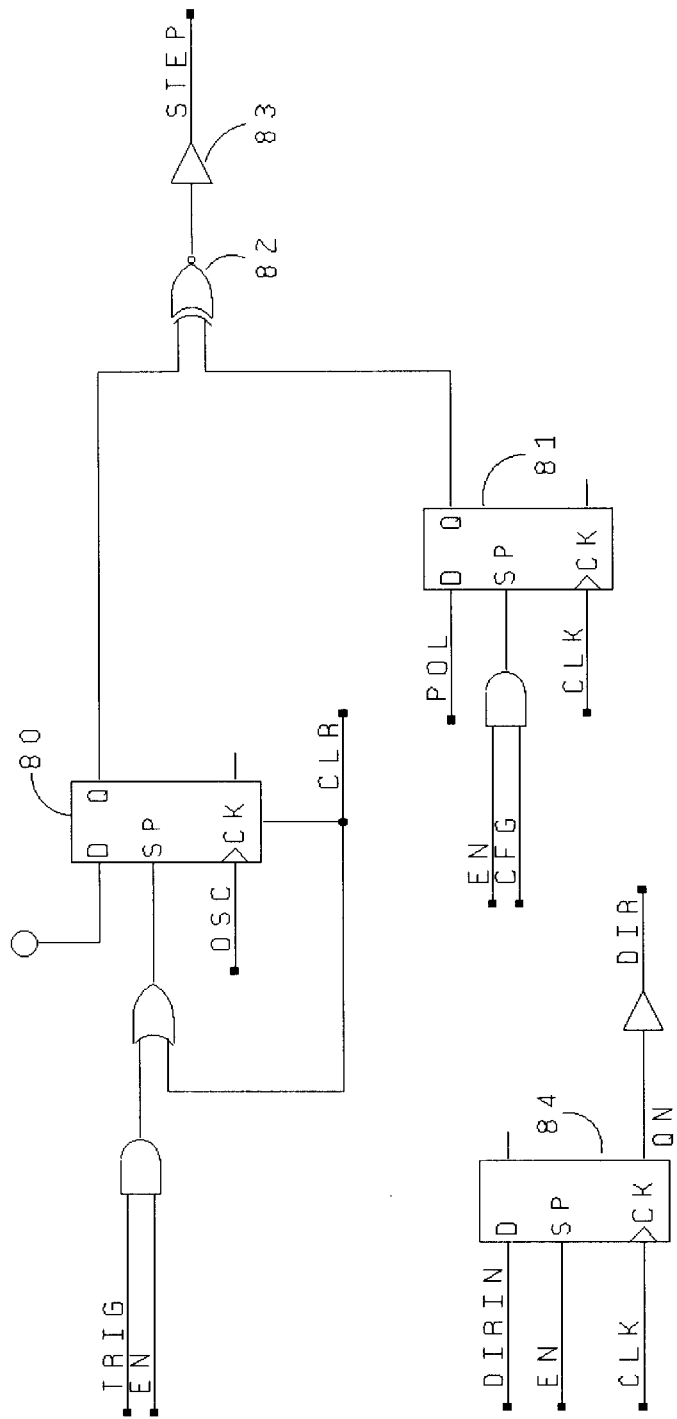
FIG. 13 illustrates the signal latching block internals.

FIG. 13 shows the circuit structure inside each of the 16 signal latch blocks. Latch 80 retains an active step pulse until cleared. The clearing signal comes from the CENX+8 signal which is "diametrically opposed" to the CENX in the circular axis scanning state machine. Step pulse durations are one-half of the total axis-scanning period. At the maximum step frequency (which equals the axis scanning cycle time) step output waveforms are 50% duty cycle.

Latch 81 is loaded by a synchronous writer operation to establish step polarity. Xor gate 82 drives buffer 83 to produce the step signal. Latch 84 retains the direction signal.

Figure 14:
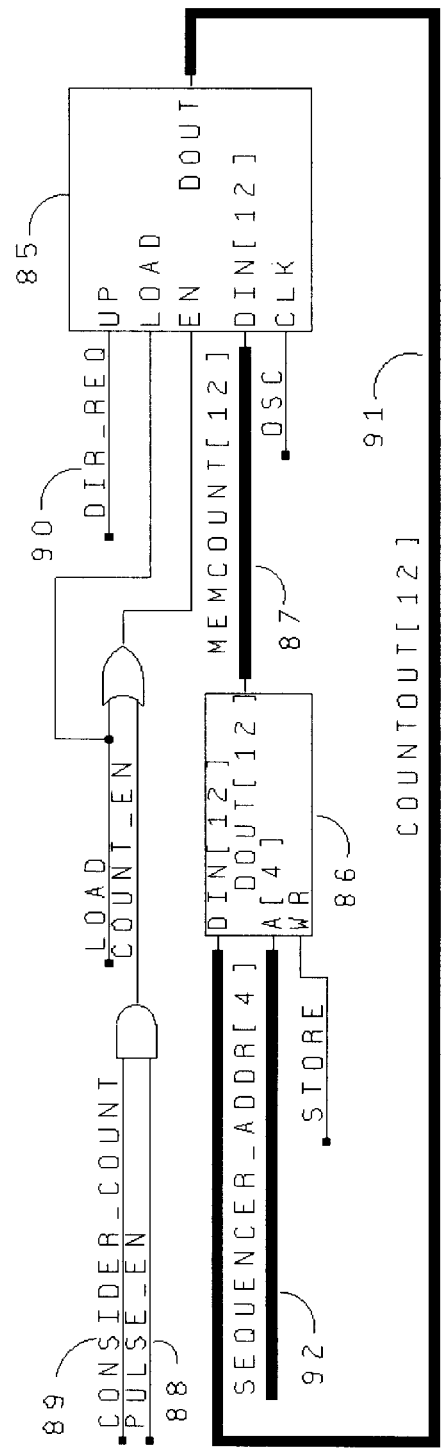
FIG. 14 illustrates the step counter.

The Step Counter circuit, illustrated in FIG. 14, counts how many steps have actually been emitted by the hardware so that the microprocessor can monitor where the motors actually are. This counting is performed through another multiplexing structure shown as a loop in the figure. The step counter 85 is a 12 bit up/down counter. The step counter 85 is loaded from a 12 bit wide by 16 deep memory block named Counter Memory 86. Counter Memory is loaded during the LOAD state through a 12 bit bus MEMCOUNT 87. Counter Memory contains the position values of the 16 axes in the system. If a step is indicated by PULSE_EN 88 during the CONSIDER_COUNT point in the cycle as represented by signal 89, the bidirectional step counter 85 increments or decrements the loaded value depending on the value of direction indicated by DIR_REQ signal 90. The result is then stored back into Counter Memory 86 through the 12 bit bus COUNTOUT during the store state. The axis scanning state machine then advances the sequencer address 92 to select the next axis.

Figure 15:
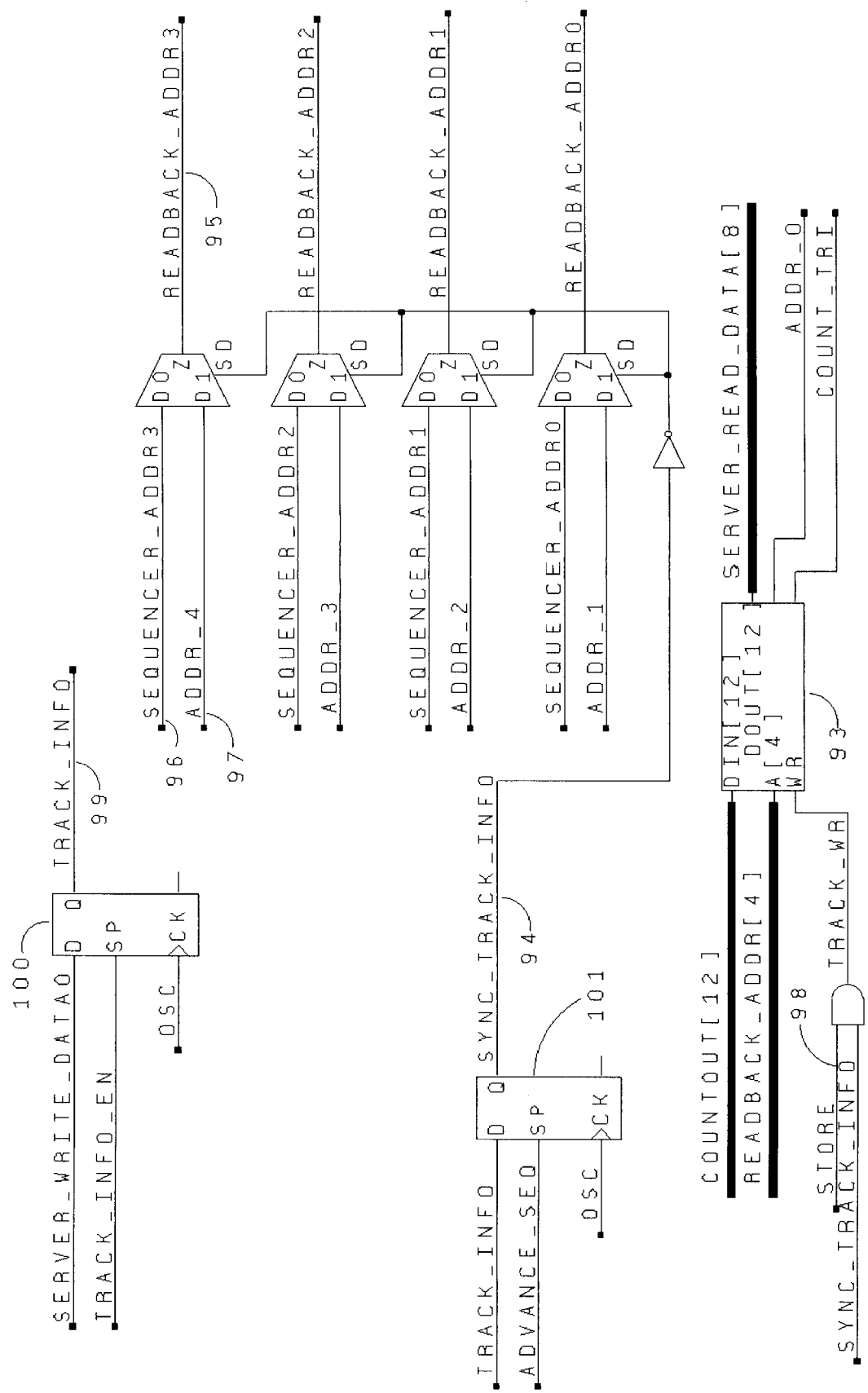
FIG. 15 shows the readback shadow memory.

Readback Shadow Memory 93, another key element of the present invention, is illustrated in FIG. 15. The microprocessor must be able to read count information without interfering with the ongoing operation of the axis scanning state machine. This is accomplished through the Readback Shadow Memory 93, a 12 bit wide by 16 deep memory block. SYNC_TRACK_INFO 94 determines whether READBACK_ADDR signals 95 are driven by the SEQUENCER_ADDR 96 or microprocessor address lines 97. During normal operation SYNC_TRACK_INFO is asserted and the READBACK_ADDR 94 is the same as SEQUENCER_ADDR 92. In this condition, the Readback Shadow Memory address lines are driven by the axis scanning state machine. The Store signal 98 places count values available on bus COUNTOUT 91 into the Readback Shadow Memory providing a copy of the information that is also getting stored back into the Counter Memory 86. When the microprocessor needs to read position information it writes a low level to TRACK_INFO through latch 100. This signal is synchronized by latch 101 to switch control of the Readback Shadow Memory during a safe point in the load-count-store-advance cycle. The microprocessor now directs the address lines of the Readback Shadow Memory and can read information at will while the Counter Memory 86 continues operation as directed by the state machine. After reading, the microprocessor sets SYNC_TRACK_INFO high again to allow the Readback Shadow Memory 93 to be updated with current information available on the COUNTOUT bus 91.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A multiplexing rate generator/counter circuit for controlling stepper motors comprising:
    an accumulator memory block,
    an edge detector,
    an axis scanning state machine,
    a position counter memory block,
    a position readback memory block,
    a configuration memory block,
    and an addend memory block; wherein
    at least one of said position counter memory block, said position readback memory block, said configuration memory block, or said addend memory block is an addressable memory block, a depth of said addressable memory block is equal to a number of motors being controlled by said circuit; and wherein
    said rate generator/counter circuit comprises a plurality of memory structures, each memory address in said memory structures represents a stepper motor in a subject system,
    said axis scanning state machine drives memory structure address lines in a circuitous manner to cycle among all stepper motors in said system such that at each memory address visit, a current state of said system is established in said rate generator/counter circuit based on information stored in each said memory address from a preceding cycle of said scanning state machine,
    an addition operation of said addend memory block and said accumulator memory block change accumulator memory block value in said accumulator memory block such that when said accumulator memory block overflows, step pulses are generated which are routed, along with axis direction signals from said configuration memory, to a subject stepper motor by means of a switch, said drive signals are then latched in non-multiplexing latches; such that
    an axis-scanning cycle frequency of N Hz supports a step rate of N Hz.

2. The multiplexing rate generator/counter circuit of claim 1 wherein:
    a synchronous writer stages data ahead of said memory blocks and then performs a write operation into said memory blocks at a time that will not disrupt operation of said circuit, said synchronous writer comprises a data register on an 8-bit bus, an information target register and a demultiplexer that are used to identify a desired target memory block for said data,
    a number of an axis desired to receive said data is stored in an axis target register, a pending write event is indicated by a signal which goes high after said information target register has been written to, and wherein
    a comparator continually compares successive axis addresses to a stored axis address, and when an axis address matches said stored axis address, a write signal is generated that enables said circuit to write said data to said desired target memory block.

3. The multiplexing rate generator/counter circuit of claim 1 wherein:
    a shadow memory block is provided for at least one of said memory blocks, a depth of said shadow memory block is equal to a number of axes being controlled by said circuit, said shadow memory block enables said circuit to safely read information in an associated memory block,
    said shadow memory block being switched to an off line state wherein it is removed from said load-count-store-advance cycle of said circuit so that data contained in said shadow memory block can be manipulated through a microprocessor of said circuit so that position information can be read, while in said off line state, write activity to said shadow memory block is inhibited so that data in said shadow memory block is stable, after said data is read, said shadow memory block is switched to an on line state, during which it is written with data from said associated memory block.

* * * * *